JOHN R. FITZPATRICK
INVENTOR.

BY Albert S Perry
ATTORNEY

April 27, 1965 J. R. FITZPATRICK 3,180,590
PRESSURIZED AIRSHIP
Filed Jan. 23, 1963 4 Sheets-Sheet 2
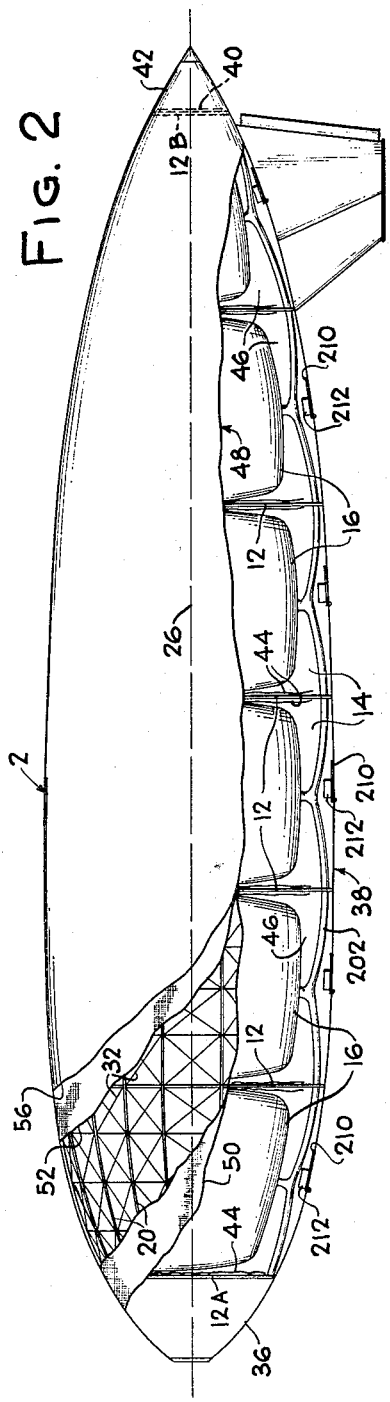
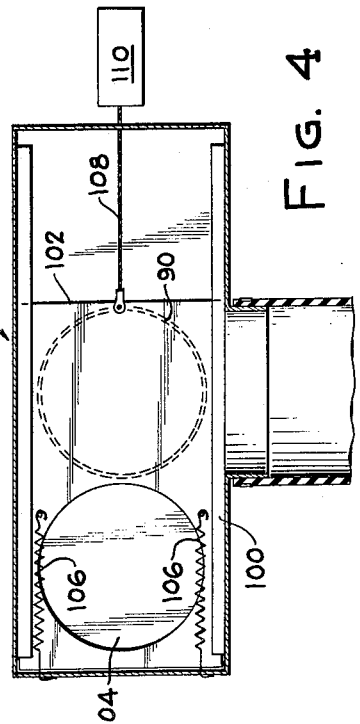
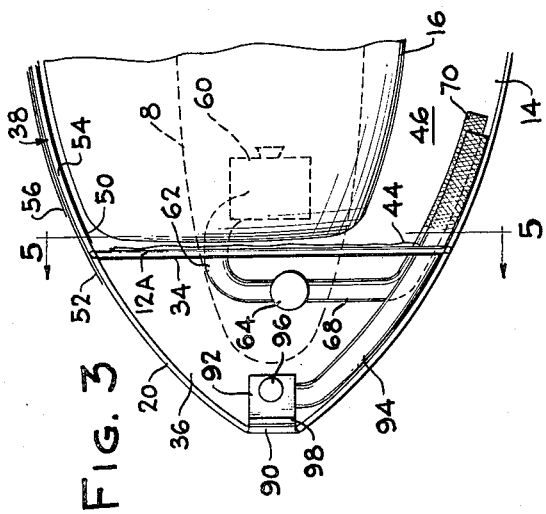
JOHN R. FITZPATRICK
INVENTOR.
BY Albert Sperry
ATTORNEY April 27, 1965   J. R. FITZPATRICK   3,180,590
PRESSURIZED AIRSHIP
Filed Jan. 23, 1963   4 Sheets-Sheet 3
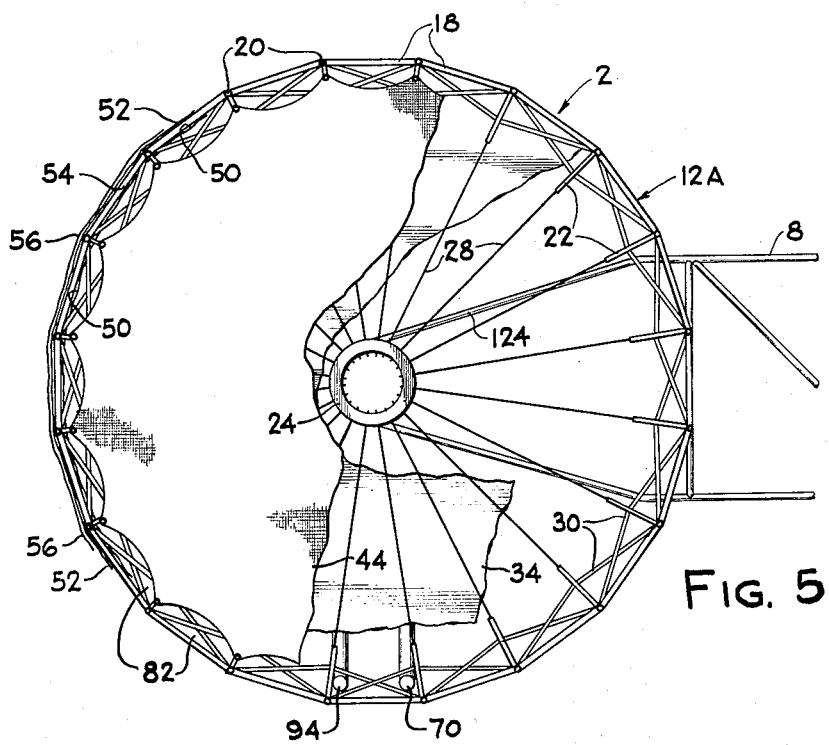
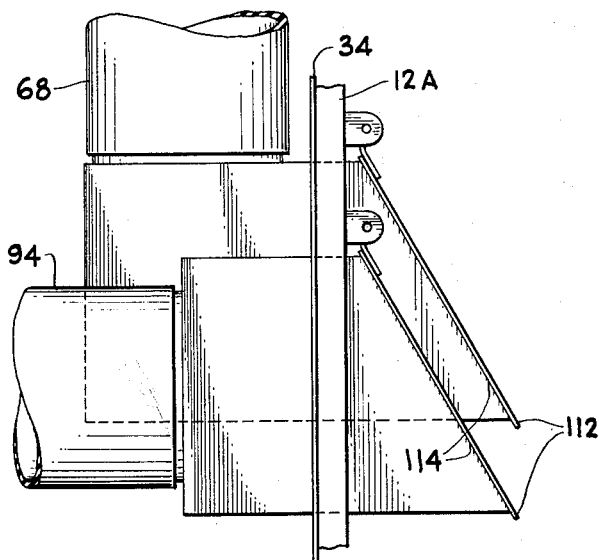
JOHN R. FITZPATRICK
INVENTOR.
BY Albert Sperry
ATTORNEY

JOHN R. FITZPATRICK
INVENTOR.

BY Albert Sperry

ATTORNEY

3,180,590
PRESSURIZED AIRSHIP
John R. Fitzpatrick, Levittown, Pa., assignor to Aereon Corporation, King of Prussia, Pa., a corporation of Pennsylvania
Filed Jan. 23, 1963, Ser. No. 253,357
7 Claims. (Cl. 244—30)

This invention relates to lighter-than-air craft and is directed particularly to constructions possessing advantages and characteristics of both the rigid and non-rigid types of airships.

Non-rigid airships such as "blimps" have an envelope formed of flexible material and embody a single large cell for receiving and holding the hydrogen, helium or other buoyant gas employed. Such constructions are relatively less expensive and easier to construct than rigid type airships. However, because of the lack of a framework, the control car, any passenger or freight cabin, as well as the motors, propellers, and their mountings must be located on the exterior of the envelope and supported therefrom by means of numerous catenaries, attaching lines and other supporting means. As a result, the externally located elements create turbulence and increase the drag and reduce the aerodynamic efficiency of the airship. Furthermore, it is necessary to form the envelope of such strong, heavy, and reinforced fabric or other material that little or no saving in weight is effected over that of a rigid type aircraft of comparable size. Moreover, the use of a single gas containing cell within the envelope renders such airships vulnerable to damage or even complete destruction in the event of a relatively minor tear or injury to the envelope. Such constructions also present many control problems due to the expansion and contraction of such a large single cell of gas upon relatively limited change in temperature.

For these and other reasons, the practical size of the envelope which can be employed in a non-rigid airship is limited and seldom can exceed a million cubic feet. Furthermore, since the shape of the envelope is maintained, and to some extent determined, by the pressure of the buoyant gas within the envelope, it is not possible to attain the characteristic elongated shape and aerodynamically preferable configuration of a rigid airship unless an internal framework construction is employed.

Rigid type lighter-than-air craft are more expensive to build than are "blimps," but they may be vastly greater in size with the result that the pay load, as well as the range, speed, and maneuverability of the airship are increased; whereas, its safety and dependability under adverse weather conditions have been repeatedly established. Furthermore, the capacity of the storage space within a rigid type airship can be increased and utilized to greater advantage. Of even greater importance is the fact that the envelope can be designed to attain much greater aerodynamic efficiency and boundary layer control assuring easier manipulation of even the largest airships. Rigid type airships also contain numerous separate cells for the buoyant gas within the envelope with the result that better balance and control of the airship is afforded and damage or leakage of gas from any one cell within the envelope will not be fatal or even dangerous.

In accordance with the present invention, the outstanding advantages of both rigid and non-rigid airships are combined in a novel manner so that airships having substantially any desired size may be produced. Their shape can be chosen so as to attain the optimum strength with the desired aerodynamic efficiency and required pay load accommodations. Moreover, the present invention renders it possible to utilize a relatively light framework within the airship envelope without reduction in strength or sacrifice in safety. At the same time, control or variation in the temperature and volume of the buoyant gas employed can be effected readily so as to facilitate the control and manipulation of the airship.

These results are preferably attained by providing an airship with a framework of the desired size, shape and strength and containing a plurality of cells for buoyant gas within the envelope of the airship. In addition to these elements, means are provided for maintaining air under pressure within the envelope and about the buoyant gas containing cells. In this way, externally applied forces exerted on the airship due to wind, barometric air pressure, snow, hail and rain, as well as a substantial part of the forces and pressures due to maneuvering of the airship may be absorbed or taken up by the air inflated envelope and will be transmitted to the airship framework to a substantially reduced degree. This strengthening action of the compressed gas interior serves to relieve the framework itself of sufficient strains, impacts and other forces to permit the usage of relatively light framing elements and reduces the number and weight of reinforcing struts or bracing members required in the framework.

An important additional function of the air barrier extending about the cells for the buoyant gas resides in its thermal insulating action whereby sudden changes in the temperature of the ambient air through which the airship is passing, or the occurrence of clouds which reduce the radiant heat transmitted to the envelope, do not give rise to corresponding sudden changes in the volume or buoyancy of the gas within the cells.

In the preferred embodiments of the invention, the air within the air barrier is circulated in such a manner as to assure substantial uniformity or control of the temperature of the buoyant gas within the gas cells enclosed within the outer envelope of the airship. Thus, if desired, the ambient air may be drawn in to the envelope near the nose of the airship or at any other convenient point and it may be discharged adjacent the tail of the ship to provide a continuously changing air barrier maintained under controlled pressure. The temperature and pressure of such air may remain constant or it may be changed from time to time to compensate for variations in the ambient air temperature, the barometric pressure or the weather conditions encountered. The air thus circulated may also, or in the alternative, be heated or cooled to an extent sufficient to control or vary the volume of the buoyant gas in the cells about which the air is circulated. In this way, the altitude, or the load carrying capacity, of the airship can be varied or controlled without resorting to the use or discharge of ballast from the airship. Vertical take-off and landing of the airship can be readily effected by controlling the temperature and pressure of the air within the air barrier and by producing similar, complementary, or compensating changes in the temperature and volume of the buoyant gas within the gas cells in the airship.

Accordingly, the principal objects of the present invention are to combine the salient advantages of both rigid type and non-rigid type airships; to increase the strength and resistance to damage of lighter-than-air ships; to improve the control and operational characteristics of lighter-than-air craft; and to reduce the dangers heretofore presented in the construction and operation of conventional rigid and non-rigid airships.

These and other objects and features of the present invention will appear from the following description thereof wherein reference is made to the figures of the accompanying drawings.

In the drawings:
FIG. 1 is a top plan view with parts broken away illustrating a typical embodiment of the present invention;

FIG. 2 is a side elevation of the airship of FIG. 1 with parts broken away;

FIG. 3 is an enlarged sectional view of the nose portion of one of the outer hulls of the airship shown in FIG. 1;

FIG. 4 is a sectional view of a detail of the construction shown in FIG. 3;

FIG. 5 is a transverse sectional view of a portion of the airship illustrated in FIG. 1;

FIG. 6 is a side elevation of a detail of the construction shown in FIG. 1; and

Figure 1:
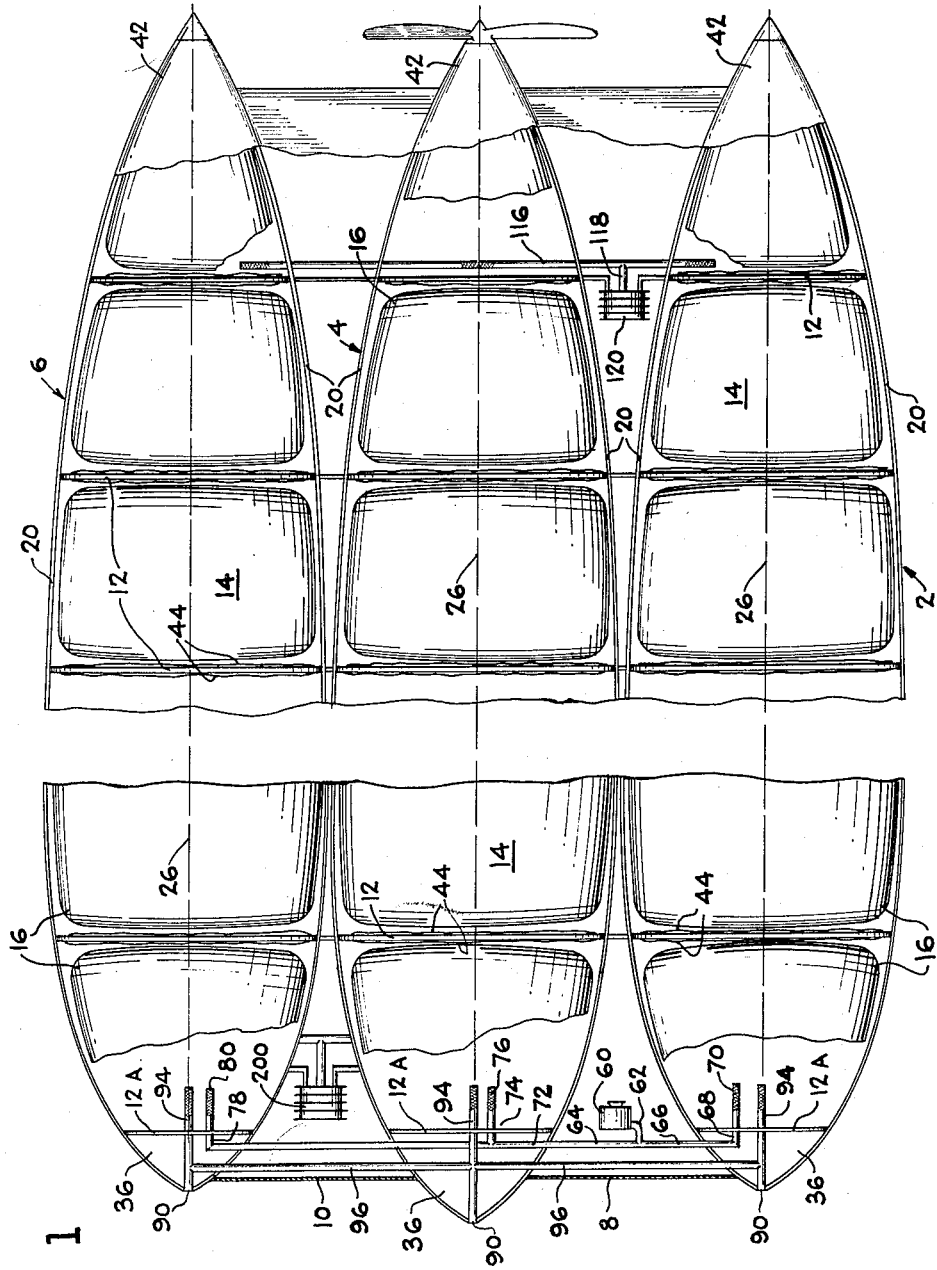

In that form of the invention chosen for purposes of illustration in FIGS. 1, 2 and 5, the airship is of the type shown and described in co-pending applications Serial Nos. 206,384 and 232,402. As there disclosed, the airship has a plurality of hulls indicated at 2, 4 and 6 with airfoils 8 and 10 extending between the hulls and throughout substantially the entire length of the ship. Each of the hulls embodies a plurality of ring assemblies 12 which are spaced apart longitudinally of the airship to define a plurality of compartments 14, in each of which is located a cell 16 containing buoyant gas such as helium, hydrogen, or the like. The ring assemblies preferably are of the type shown and described in copending application Serial No. 206,384, and embody peripheral members 18 to the ends of which longerons 20 are connected. King posts 22 extend radially inwardly from the points where the longerons are connected to the peripheral members 18 and each ring assembly is provided with a concentration ring 24 located adjacent the longitudinal axis 26 of the hull by means of wires or other tension members 28. Diagonal bracing elements 30 extend between the king posts 22 and cooperate with the other elements of the ring assembly to maintain the ring assemblies in a flat plane extending at right angles to the longitudinal axes 26 of each of the hulls 2, 4 and 6. At the same time, diagonally extending strengthening wires or members 32 extend from the intersection of one peripheral member 18 with a longeron 20 to another similar intersection as shown in FIG. 2.

The foremost ring assembly 12A of each hull is provided with a front bulkhead 34 which closes or seals off the nose portion 36 of each hull from the central gas cell containing portion 38 of the hull. In a similar way, the rearmost ring assembly 12B of each hull may be provided with a rear bulkhead 40 which closes or seals off the tail portion 42 of each hull from the central gas cell containing portion 38. In the central hull, or in each hull having an engine located in the tail portion 42 thereof, the rear bulkhead 40 may also serve as a fire wall, or a vibration or sound-absorbing means.

Those ring assemblies 12 which are located in the central portion 38 of each hull and define the various chambers 14 in which the buoyant gas cells 16 are located are preferably provided with protecting sheets, webs or screens 44 located on opposite sides thereof. Such webs serve to protect the flexible material of which the gas containing cells 16 are formed so as to prevent puncturing, abrasion or injury to the cell-forming material when the cells are filled or expanded by buoyant gas and press against the concentration rings 24, king posts 22, tension members 28, or other elements of the ring assemblies.

The protecting sheets 44 may be formed of any suitable material such as nylon or other light-weight, but strong, fabric, plastic or thin heat-conducting or heat-reflecting sheet metal. The webs or sheets 44 may in the alternative be formed of heat-insulating or shielding material such as asbestos sheets, felt, unwoven fabric, or the like which will serve to stabilize or maintain the gas within each cell 16 at a substantially constant or predetermined temperature independently of the temperature of the gas in an adjacent cell. In the alternative, if metallic sheet material, screening or the like is used in forming the webs 44, such webs may serve to promote the transfer of heat from the gas in one cell to that in another so as to equalize the temperature of the gas in the various cells and accelerate temperature changes within the various cells in the airship and aid in maintaining uniformity thereof.

Further, when using webs or screens formed of metal, graphite cloth, or other material having high heat conductivity or capable of being heated by the passage of electric current therethrough, the protecting webs or screens 44 may themselves be used to control or vary the temperature of the buoyant gas within the adjacent gas cells 16 or the temperature of the air within the air space 46 about the gas cells 16 and within the central portions 38 of the hulls, or both.

In order to attain the advantages of a "blimp" or pressurized airship in combination with the advantages of rigid hull airships and at the same time, if desired, effectively control the temperature of the buoyant gas within the cells 16, constructions embodying the present invention are provided with means for establishing and maintaining or controlling the pressure of the air within the air space 46 in the central buoyant gas cell containing portion 38 of the hulls. Such air pressure will ordinarily be greater than the pressure of the ambient air and directly related thereto. However, if desired, it is possible to establish and maintain the same pressure within and on the exterior of the envelope 48 which extends about the structural framework of the ship and encloses the central gas cell containing portion 38 of the hulls 2, 4 and 6.

For most purposes, the air pressure maintained within the air space 46 about the buoyant gas cells 16 and within the envelope 48 should be equal to from about 0.1 inch to 2.0 inches of water pressure per square inch of envelope surface in excess of the ambient air pressure applied to the exterior of the envelope. Such internal air pressure may thus vary from about 2.0 to 25 millimeters of mercury per square centimeter. However, as indicated above, the pressures on the interior and exterior of the airship envelope may at some times and under some conditions be equalized; whereas, the upper limit of the air pressure developed within the airship envelope and about the buoyant gas cells 16 will depend primarily upon the strength and porosity, or the nature of the construction, of the envelope 48 which encloses the space 38 in which the gas cells 16 are located.

In a typical and preferred embodiment of the present invention, the envelope 48, which encloses the airship framework, is formed of a plurality of layers of material which may be spaced apart to provide one or more dead air spaces between the air space 46 surrounding the gas cells and the exterior of the airship. In this way, the envelope serves to insulate the air space 46 from the ambient air so as to limit the effects of radiation or heat exchange between the interior and exterior of the envelope. Thus, as illustrated in FIGS. 2 and 5, the longerons 20, peripheral ring members 18, and diagonal strengthening wires 32 which extend about the hulls may be covered by an inner layer 50 of rip-stop nylon which is preferably coated with aircraft "dope" to stiffen, seal, and shrink the nylon. In this way, the envelope 48 will present a strong, smooth, inwardly facing layer of material engageable by the buoyant gas cells 16 within the compartments 14 of the central portion 38 of each hull. A similar "doped" layer 52 formed of rip-stop nylon is applied over the longerons, peripheral ring members and diagonal strengthening wires on the exterior of the airship framework. The layers of material 50 and 52 are, thus, held in spaced and parallel relation on the interior and exterior of the airship framework so as to present a dead air space 54 therebetween. If desired, the dead air space 54 may contain or be substantially filled with thermal insulating material and, of course, if the inner and outer layers of material 50 and 52 are formed of metal or otherwise constructed so as to be strong and substantially airtight, the space 54 may be evacuated or maintained under reduced pressure to serve as a heat barrier or thermal insulating means.

In most cases, and in order further to strengthen the envelope 48 and limit the transfer of heat therethrough by radiation or conduction, an outer layer of material 56 is applied over the outer layer 52 of the rip-stop nylon. For this purpose, a strong, tough, and substantially airtight material is preferred. Thus, the airship may be metal clad, if desired. However, resinous or plastic sheet material is generally preferred and one type of plastic sheet material which is particularly suitable for use in forming the external covering 56 for the airship is the polyvinyl fluoride material which is sold by E. I. du Pont de Nemours under the registered trademark "Tedlar." This material has a tensile strength of from about 10,000 to 15,000 p.s.i. by the "Instron" test method, and its tensile strength is not objectionably impaired at temperatures ranging from well below zero to 300° F. A particular advantage of "Tedlar" resides in its extremely low permeability to gases such as air, helium and water vapor. However, it is also highly resistant to chemical action and abrasion, it can be sealed by the application of heat or suitable adhesives and it is non-flammable. Nevertheless, other types of plastic, polymeric or metallic materials as well as laminated fabric or sheet materials can be used in forming the outer layer or layers 56 of the envelope 48.

The material "Tedlar" is also particularly suitable for use in forming the gas cells 16 located in the various compartments 14 of the central portion 38 of the airship. However, other flexible plastic, resinous, laminated, or treated fabric materials which exhibit low permeability to gases such as helium can be used in forming the cells 16 for the buoyant gas.

In order to attain the advantages which characterize pressurized airships while employing a framework construction which is strong and light in weight for providing the aerodynamically efficient shape and increased size and strength of rigid airships, the present invention embodies means for creating and maintaining or controlling the desired air pressure within the central portions 38 of the hulls, 2, 4 and 6 and in the air spaces 46 between and about the cells 16 of buoyant gas. Any suitable or preferred type of blower, turbine, fan or air pressure creating means may be employed and it may be located at any suitable or preferred position within the airship. Thus, for example, a blower 60 may be mounted within one or the other of the airfoils or fillets 8 or 10, or if desired, a blower may be located in each airfoil. As shown in FIG. 1, the blower 60 is located in the airfoil 8 on the left hand side of the airship between the hulls 2 and 4 and near the leading edge of the fillet. The air from blower 60 is discharged through the outlet pipe 62 to a transversely extending air duct 64. The portion 66 of the air duct 64 extends to the left from the blower outlet pipe 62 as seen in FIG. 1 to the nose portion 36 of the hull 2. The duct portion 66 then turns rearwardly as shown at 68 and passes through the front bulkhead 34 to the foremost gas cell-containing chamber 14 within the central portion 38 of the airship envelope. The portion of the air duct 68 which is located within the foremost chamber 14 is positioned adjacent the bottom of the chamber below the buoyant gas-containing cell 16 as shown at 70 so as to communicate with the air space 46 within chamber 14 but external to the cell 16. The portion 70 of the air duct is preferably formed of relatively stiff material such as wire screen or perforated pipe through which air from the blower 60 will flow into the air space 46 about the cell 16 to create the desired air pressure therein. The stiff character of the perforated portion 70 of the air duct prevents the duct from being collapsed or reduced in cross section upon expansion of the gas within the cell 16 and the application of pressure to the duct portion 70 by the expanded upper portion of the cell.

The air duct 64 connected to the outlet pipe 62 of the blower 60 also extends to the right from the blower as at 72 in FIG. 1 to the hulls 4 and 6. A rearwardly extending duct portion 74 passes through the front bulkhead of the central hull 4 of the airship and has a perforated air discharging end portion 76 which is located near the bottom of the foremost compartment 14 of the central hull 4. In a similar way, the right hand end of the air duct 64 as seen in FIG. 1 is turned rearwardly at 78 and has a discharge end 80 located near the bottom of the foremost compartment 14 of the right hand hull 6 of the airship.

In this way, the blower serves to supply air under pressure to the air spaces 46 about the cells 16 within the foremost compartment 12 in the central portion 38 of each of the hulls.

The webs or screens 44 located on the opposite sides of the ring assemblies 12 to protect the cells 16 from abrasion or injury, do not extend all of the way to the edges of the ring assemblies. Instead, as shown in FIG. 5, the screens 44 serve to provide openings 82 about the edges thereof affording communication between the air spaces 46 in adjacent compartments 14 within the central portion 38 of the airship. Therefore, the air entering the foremost compartment 14 of each hull will flow rearwardly of the airship through the openings 82 adjacent the edges of the webs or screens 44 from one compartment 14 to another until the pressure in all of the compartments within the envelope of the airship have been equalized. As a result, the envelope 48 extending about each hull and the framework thereof will be distended and forced outward so as to oppose externally applied forces exerted on the airship through the envelope. For example, the weight of ice, snow or sleet collecting on the envelope, much of the wind pressure and localized forces exerted on the airship by reason of gusts of wind, and many of the forces developed as an incident to steering or other maneuvering of the airship will be absorbed or diminished as they are taken up by the inflated envelope and will reduce the strains applied to the ring assemblies and other structural framework elements within the envelope. Therefore, the over-all strength or safety factor of any airship framework can be increased, or the weight, strength and bulk of various framework elements can be reduced considerably. The useful load which the airship may carry and the operating range of the airship can be increased; whereas, the cost of the airship may be decreased.

As a further or alternative means for creating the desired air pressure within the various hulls of the airship ram air means may be employed so that the pressure or inertia of air which would otherwise be applied directly to the airship and its envelope may be employed to create the desired air pressure within the envelope. For this purpose, as shown in FIG. 3, the nose portion 36 of each hull may be provided with a ram air tube 90 that opens forwardly and preferably is positioned on the axis 26 of the hull and concentric therewith. The inner end of the ram air tube 90 communicates with an air diffusing or baffling chamber 92 from which a ram air duct 94 extends through the front bulk head 34 to the foremost compartment 14 within the hull and to the air space 46 about the gas cell 16 within the compartment.

With this construction, the air which would otherwise impinge on the nose of each hull is caused to enter the diffusion chamber 92 where it builds up air pressure and flows through the ram air duct 94 to raise the pressure of the air within the envelope of the airship hull. However, in order to equalize the air pressure within the various airship hulls as developed by the ram air means, a pressure equalizing duct 96 extends transversely of the airship to connect all of the air diffusing chambers 92 together.

The ram air pressure producing means may be used in place of the blower 60 when the airship is flying at high speed or is facing into the wind so that the pressure developed within the airship envelope is sufficiently high to require no addition thereto. On the other hand, the blower and ram air pressure means may be used to supplement each other; whereas, when the airship is stationary or no appreciable ram air pressure is developed during flight, the blower 60 may be used by itself.

In any event, in order to control the action of the ram air pressure producing means, the ram air tube 90 is preferably provided with control means 98 which may include a gate valve 100 or the like as shown in FIG. 4. The gate valve 100 is in the form of a plate 102 with an opening 104 therein which is of substantially the same size as the ram air tube 90. The plate 102 is normally urged toward an air tube closing position by means of a spring 106. However, the plate is movable transversely of the air tube 90 against the action of spring 106 by means of a cable 108 which extends to the cockpit or control panel of the airship. The amount, if any, of the ram air pressure which is utilized in pressurizing the airship envelope, or in supplementing the action of the blower 60, can, therefore, be controlled and varied as desired by the operation of cable 108. While the cable 108 may be operated manually, electrically, mechanically or otherwise, such operation also may be controlled by pressure responsive means 110 or by any other desired form of sensing means to assure the development and control of the air pressure within the envelope in any way to assure the desired operation of the airship.

As a practical consideration and in the interest of safety, it is desirable to prevent the loss of pressure or undue variations in pressure of the air within the airship envelope 48. Reduction in the air pressure developed within the envelope by the blower due to escape of the air through the ram air tube 92 will normally be prevented by the gate valve 100 or other control means associated with the ram air tube. Moreover, the pressure of the air within the envelope might, upon occasion, fall below the pressure of the ambient air upon rapid descent of the ship from a high altitude, where the air is relatively rarified, to a low altitude, where the air is relatively dense. Rapid and relatively great changes in the temperature of the air within the envelope 48 might give rise to the existence of a lower air pressure within the airship envelope than on the exterior thereof. Since the framework of the airship is not designed to withstand extensive external air pressures, it is desirable to provide the airship with air inlet means such as an implosion valve. As shown in FIG. 6 of the drawing, this may be accomplished by providing both the portion 68 of the blower air duct 64 which passes through the front bulkhead 34 to the foremost chamber 14, and the portion of ram air duct 94 which passes through the front bulkhead, with check valves or pivoted implosion valves 112 which open inwardly toward the chamber 14 but normally engage inclined surfaces 114 of the tubes 68 and 94 to close and seal said tubes against back pressure or outward flow of air therethrough as shown in FIG. 6. With constructions of this type, the occurrence of a higher air pressure on the exterior than on the interior of the envelope 48, will automatically cause the implosion valves 112 to open and allow air to enter the envelope until the pressure of the air on both the interior and exterior of the envelope has been equalized.

In order to equalize the air pressure in each of a plurality of hulls in the airship, a pressure equalizing tube 116 extends transversely of the airship from one hull to the other. This tube provides open communication with each hull. While any suitable or preferred number of such pressure equalizing tubes may be used, it is generally sufficient to provide a single pressure equalizing tube 116 which extends transversely of the airship and communicates with the rearmost compartment 14 in each of the hulls 2, 4, and 6. In this way, all of the air spaces 46 in all of the compartments 14 in the various hulls 2, 4 and 6 will be placed in free communication with each other through transverse tube 116 and the openings 82 about the edges of the webs or screens 44 on opposite sides of the ring assemblies 12 of the airship framework.

Such free, open communication between the compartments in each hull and between one hull and the others assures rapid and continuous equalization of the air pressures within the airship envelope. Accordingly, no localized excesses or deficiencies in air pressure can develop; whereas, the entire envelope partakes of the characteristics of a "blimp" or non-rigid airship to the extent that external forces exerted on the airship envelope are largely relieved and stresses which might otherwise be transmitted to the structural framework of the airship are reduced.

Although the pressure of the air within the airship envelope and about the buoyant gas-containing cells can be controlled or varied to some extent by controlling the operation of blower 60 and/or the operation of the ram air pressure means used, such control will seldom be sufficiently sensitive for most operating conditions. Therefore, it is most desirable to provide the airship with a pressure relief valve which will serve to limit the pressures within the hulls. As shown in FIG. 1, such a pressure relief valve is indicated at 120 and is connected by the pressure relief tube 118 to the transversely extending pressure equalizing tube 116 located within the airfoil 10 adjacent the rear of the airship and between the hulls 2 and 4.

In view of the great area presented in an airship envelope, the total pressure to which the envelope is subjected may vary greatly with even a minute variation in the pressure of the air within the envelope. Therefore, the pressure relief valve 120 and other means employed to control and maintain the desired air pressure within the envelope should be extremely sensitive. Thus, the valve should be constructed and designed so as to be actuated by pressures not exceeding 0.1 inch of water and to respond to variations in pressure in that range which may not be more than 0.02 inch of water. Furthermore, in view of the tremendous volume of air within the envelope of even a relatively small airship and the large amount of air which must be vented to produce a significant change in the pressure of such air, the valve 120 must be movable or have a capacity to permit the flow of large volumes of air therethrough within a relatively short period of time. No satisfactory valves having such capabilities and sensitivity are readily available. Therefore, it may be necessary or desirable to construct a special form of pressure relief valve for use as indicated at 120.

Figure 7:
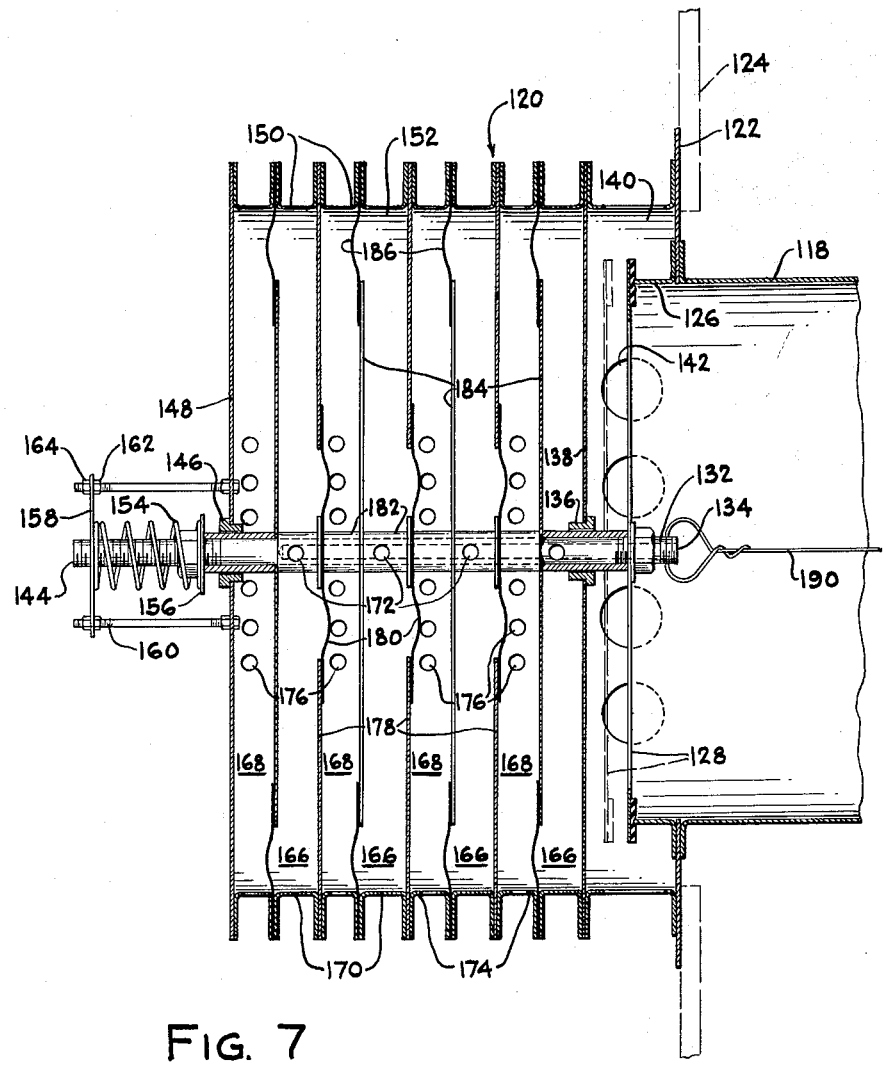
FIG. 7 is a sectional view through a preferred type of pressure relief valve which may be used in airships embodying the present invention.

As shown in FIG. 7, an air pressure relief valve having the desired capacity and capabilities has been produced by providing a construction having a mounting plate 122 which may be secured to one of the transverse beams 124 by which the framework assemblies of the hulls 2, 4 and 6 are secured together. The end of the air pressure relief tube 118 is secured to the mounting plate 122 and is surounded by the inwardly projecting valve seat ring 126. Valve member 128 is provided with a marginal valve seal 130 formed of any suitable yieldable sealing material such as cellular rubber, neoprene or other elastomeric material and positioned to engage the valve seat ring 126 to close the end of the air pressure relief tube 118.

Valve member 128 is secured to the inner end of a tubular valve stem 132 by means of a nut or the like threaded onto the exterior of the open inner end 134 of the tubular valve stem 132. The inner end of the valve stem 132 extends through an air pressure sealing bushing 136 carried by a stationary inner end plate 138 of the valve assembly. Inner plate 138 is held in place and spaced from the mounting plate 122 by an air outlet ring 140 provide with a plurality of openings 142 through which air may flow freely upon movement of the valve member 128 to its opened dotted line position of FIG. 7.

The outer end 144 of the tubular valve stem 132 is closed and extends through an air sealing bushing 146 carried by the stationary outer end plate 148 of the valve assembly. A plurality of spacer rings are located between the inner end plate 138 and the outer end plate 148 of the valve and are secured together so as to cooperate in forming a plurality of air pressure chambers 166 and a plurality of intervening ambient air chambers 168 between the end plates 138 and 148. However, the valve stem 132 which extends axially through all of the valve chambers is movable relative to the stationary end plates for actuating the valve member 128.

The valve member 128 is normally urged toward the valve seat ring 126 to close the valve by the action of a spring 154 which surrounds the closed outer end portion 144 of the valve stem projecting through the outer end plate 148 of the valve assembly. One end of the spring 154 bears against a collar 156 secured to the threaded outer end 144 of the valve stem; whereas, the other end of spring 154 bears against a retainer plate 158 mounted on the threaded bolts 160 secured to the stationary outer end plate 148 of the valve assembly. The position of the retainer plate 158 and the pressure with which the spring 154 urges the valve plate 128 against the valve seat ring 126 can be varied as desired by adjustment in the position of the supporting nuts 162 and lock nuts 164 on the bolts 160.

As indicated above, the valve 120 embodies a plurality of air pressure chambers indicated at 166 arranged in alternate relation with ambient air chambers 168. Four air pressure chambers and four ambient air chambers are shown in the valve assembly of FIG. 7, but any suitable or required number of such chambers may be employed. The air pressure chambers 166 are closed about their outer edges by imperforate ring-like spacer members 170, but are placed in communication with the air within the airship envelope by openings 172 in the tubular valve stem 132 which presents its open inner end 134 to the air pressure relief tube 118. The pressure of the air within the air pressure chambers 166 will, therefore, correspond to the pressure of the air throughout the airship envelope and may be of the order of about ½ inch of water pressure in excess of the ambient air about the airship and within the fillet 10.

The ambient air chambers 168 are provided at their outer edges with ring-like spacer members 174 which are provided with outlet openings 176 so that the pressure of the air within the chambers 168 will correspond to that of the ambient air about the airship and within the fillet 10 or other space where the valve 120 is located.

The air pressure chambers 166 are separated from the ambient air chambers 168 by means of pressure plates 178 which are secured in place at their outer edges by the imperforate ring-like spacer members 170 and the perforated ring-like spacer members 174. The ring-like spacer members 170 and 174 are, in turn, secured in place between the stationary inner and outer end plates 138 and 148 of the valve assembly. While the pressure plates 178 are, thus, held in fixed positions, the inner edges of the plates 178 are connected to the movable valve stem 132 of the valve by a flexible element 180 and the spacer element 182.

The opposite side of each air pressure chamber is defined by a valve actuating diaphragm 184 which is secured to the valve stem 132 so as to move the valve stem and valve member 128 toward and away from its valve seat ring 126. The outer edge of the diaphragm 184 is provided with a flexible connection 186 which is sealed at its outer edge between the ring-like spacer members 170 and 174.

With this construction, variations in pressure of the air within the airship envelope will be transmitted promptly to the air relief tube 118 and relief valve 120. Such pressure will then be applied through the open inner end 134 of the tubular valve stem 132 and the openings 172 in the valve stem to the air pressure chambers 166 of the valve. The pressure within the air chambers 166 will thereby be caused to differ from the pressure of the air within ambient air chambers 168 of the valve 120. The valve actuating diaphragms 184 secured to valve stem 132 will accordingly be moved to actuate valve member 128 in response to differences between the pressure of the air on the interior and the exterior of the envelope 48 of the airship. At the same time, the spring 154 may be adjusted to assure the preservation of a predetermined air pressure within the airship envelope.

The use of multiple air pressure chambers 166 to actuate the valve 128 renders it possible to multiply the force exerted on the valve stem 132 by each individual valve actuating diaphragm 184 in the assembly. Therefore, the valve 128 can be made extremely sensitive and capable of responding to relatively minute variations in the air pressure within the airship hulls. Nevertheless, the capacity of the air pressure relief valve can be made sufficiently great to assure prompt and effective control of the air pressure within the various airship hulls.

In the construction illustrated in FIG. 1, the blower 60 is located in the fillet 8 between the nose portion of the hulls 2 and 4; and the pressure relief valve 120 is located in the fillet between the tail portions of the hulls 2 and 4. The rear edge of the rear fillet may be opened to the atmosphere so that the air which is supplied to the compartments 14 within the hulls of the airship actually may be drawn inward from adjacent the rear end of the airship so as to flow longitudinally through the fillet and airfoils to the blower 60; whereas, the relief valve 120 discharges air to the rear of the airship upon operation of the relief valve.

While the valve 120 is designed and capable of being operated by means responsive to differences between the pressure of the air within the airship envelope and the ambient air, it may also be actuated by any other suitable means, and, if desired, a cable 190 may be connected to the valve stem 132 to provide for manual or emergency operation of the valve. In a similar way, the valve 120 may be actuated by means located on the airship instrument panel or elsewhere in or on the airship and in response to any chosen operating condition.

Further, if desired, each hull of the airship can be provided with its own independently operable means for establishing, maintaining or controlling the pressure of the air within each hull of the airship and about the buoyant gas-containing cells therein. Moreover, the airship may be provided with two or more air relief valves in each hull and if desired, each compartment 14 extending about each envelope may be provided with its own air relief valve.

As shown in FIG. 1 of the drawings, the pressure to which the helium or other buoyant gas with which the gas cells 16 are filled may be similarly controlled and maintained constant or varied as desired by the use of valve means 200. For this purpose, all of the various gas-containing cells 16 can be connected together by suitable flexible tubing or other duct means 202. The valve means 200 then can be actuated manually or by automatic or pressure-controlled means to prevent rupturing of the material of which the cells 16 are formed or to vent buoyant gas during any emergency or for other reasons. Further, if desired, either the air relief valve 120 or the helium control valve 200 can be operated in such a way as to maintain the buoyant gas within the cells 16 at a pressure which is related to the pressure of the air in the air space 46 about the gas cell and within the envelope 48 or at a predetermined pressure related to the pressure of the ambient air.

Further, in order to control the pressure and/or the buoyancy of the gas within the cells 16 or the pressure or buoyancy of the air within the air spaces 46 about the gas cells 16, the air within the air spaces 46 may be heated or cooled as desired. Thus, as shown in FIG. 2, each of the compartments 14 in which the gas cells are located is provided with an access door 210. A heating element such as a propane heater, an electrical resistance heater, or other means 212 can then be carried by the access door so as to be located below the gas cell 16 to generate heat for heating and expanding the buoyant gas. On the other hand, the heating element 212 can be otherwise located or mounted as desired or necessary for any particular airship size, design, or construction.

Temperature responsive means or control elements then can be actuated from the control panel of the airship or in any other preferred way. Moreover, a rapid, accurate and sensitive control of the temperature of the buoyant gas and of the air in the air space 46 about the gas cells 16 can be effected by suitable operation of heating element 212 and the blower 60 or the ram air entering the envelope through the ram air duct 90. As a result, the desired buoyancy of the airship for take-off or landing or for meeting various flight and weather conditions can be attained readily and in a manner to assure the safest and most economical operation of the airship.

While the invention as shown in the drawings and described above is specifically applied to an airship having a plurality of hulls, it will be apparent that the invention is also applicable to single hull airships and those of any conventional or preferred design. Furthermore, it will be apparent that the particular form, type, size, and shape of the airship and its framework construction or elements can be varied as desired for use in any particular airship.

It should, therefore, be understood that the form, arrangement and combination or relation of the various members or elements of the construction is capable of many modifications and changes. Accordingly, it is intended that the particular embodiment of the invention which has been shown in the drawings and described above is to be considered as illustrative only and is not intended to limit the scope of the invention.

I claim:

1. A rigid type lighter-than-air craft embodying a plurality of hulls, each having a framework therein defining a plurality of compartments within each hull, cells for buoyant gas located within the compartments within said hulls, means connecting the framework of said hulls together in fixed relative positions, each of said hulls having an envelope extending about the cells and framework therein, means for supplying air under pressure from the exterior of said envelopes to the interior thereof, means providing communication between said envelopes for equalizing the pressure of air within said envelopes and about said cells, and valve means operable to maintain air within said envelopes at predetermined pressure in excess of the pressure of air on the exterior of said envelopes.

2. A rigid type lighter-than-air craft comprising a plurality of hulls, each having a framework therein, means securing the framework of said hulls together in fixed relative positions, the framework of each hull defining a plurality of compartments, cells for buoyant gas located in said compartments, an envelope for each hull extending about said framework and the cells therein, a blower communicating with the exterior of said envelopes and the interior thereof operable to raise the pressure of air within said envelopes and about the framework and cells therein, a ram air inlet tube facing forwardly of said airship and communicating with at least one of said envelopes, means for controlling the operation of said blower, means for controlling the flow of air through said ram air inlet tube, and means for maintaining the air within said envelopes and about said cells at a predetermined pressure in excess of the pressure of air on the exterior of said envelopes.

3. A lighter-than-air craft as defined in claim 2 wherein means are provided for raising the temperature of the buoyant gas within said cells.

4. A lighter-than-air craft as defined in claim 2 wherein the envelopes are of a double-wall type affording thermal insulation limiting the flow of heat therethrough, and means are provided for heating the air within said envelopes and about said cells.

5. Lighter-than-air craft comprising a plurality of elongated hulls, a structural framework for each of said hulls, transversely extending members connected to the framework of said hulls and serving to hold said hulls in substantially fixed relative positions, a plurality of cells for buoyant gas located in each of said hulls and confined within said framework, a separate envelope located on the exterior of the structural framework of each of said hulls and enclosing said framework and the cells therein, a fillet presenting an airfoil surface located between said hulls and envelopes and enclosing said transversely extending members, air supply means communicating with the exterior of said envelopes and with the interior thereof operable to force air under pressure in excess of that of the ambient air into said envelopes and about said frame and cells, and valve means communicating with said envelopes and operable to maintain the air within the envelopes at a pressure in excess of the ambient air.

6. Lighter-than-air craft as defined in claim 5 wherein said air supply means and valve means are located within said fillet.

7. Lighter-than-air craft as defined in claim 5 wherein the air intake means is provided with an implosion valve.

References Cited by the Examiner
UNITED STATES PATENTS

| | | | |
|---|---|---|---|
| 954,215 | 4/10 | Schilling | 244—126 |
| 1,291,687 | 1/19 | Jenkins | 244—51 |
| 1,362,578 | 12/20 | Kraft | 244—97 |
| 1,496,416 | 6/24 | Honeywell | 244—30 |
| 1,509,527 | 9/24 | Parker | 244—97 X |
| 1,669,592 | 5/28 | Arnstein | 244—125 |
| 1,833,033 | 11/31 | Ortega | 244—25 |
| 2,180,036 | 11/39 | Dardel | 244—97 |
| 2,428,656 | 10/47 | Elliot et al. | 244—97 |

FERGUS S. MIDDLETON, *Primary Examiner.*